United States Patent [19]
Fujimoto

[11] Patent Number: 5,396,592
[45] Date of Patent: Mar. 7, 1995

[54] IMAGE SIGNAL INTERPOLATING CIRCUIT FOR CALCULATING INTERPOLATED VALUES FOR VARYING BLOCK SIZES

[75] Inventor: Tadao Fujimoto, Tokyo, Japan

[73] Assignee: Sony Corporation, Tokyo, Japan

[21] Appl. No.: 886,429

[22] Filed: May 20, 1992

[30] Foreign Application Priority Data

May 30, 1991 [JP] Japan ................. 3-155749

[51] Int. Cl.⁶ .......................................... G06F 15/62
[52] U.S. Cl. ................... 395/162; 395/164; 395/166; 345/189
[58] Field of Search ............... 395/162, 163, 164, 166; 345/136, 189, 190; 348/571

[56] References Cited

U.S. PATENT DOCUMENTS

| | | | |
|---|---|---|---|
| 4,712,141 | 12/1987 | Tomohisa | 358/280 |
| 5,008,752 | 4/1991 | Van Nostrand | 358/160 |
| 5,060,172 | 10/1991 | Engelse et al. | 364/522 |

FOREIGN PATENT DOCUMENTS

0193836A1 9/1986 European Pat. Off. ....... G11C 8/00

OTHER PUBLICATIONS

Signal Processing of HDTV, 11 Aug. 1989, Turin, Italy, pp. 331–338, XP000215254, Tamitani et al.: "A Real-Time HDTV Signal Processor-Architecture and Implementation."

Patent Abstracts of Japan, vol. 005, No. 034 (E–048), 4 Mar. 1981 & JP-A-55 158 771 (NEC Corporation) 10 Dec. 1980.

IEEE Transactions on Circuits and Systems, vol. CAS33, No. 2, Feb. 1986, New York, US, pp. 250–259; Fortier et al.: "Architectures for VLSI Implementation of Movement-Compensated Video Processors."

*Primary Examiner*—Robert J. Richardson
*Attorney, Agent, or Firm*—Charles P. Sammut; Limbach & Limbach

[57] ABSTRACT

An image signal interpolating circuit including a plurality of integrated circuits 31, each integrated circuit 31 including therein memories 40 to 43 for holding respective pixel data of 2×2 dots, operational or computational elements 44 to 47 for calculating interpolated values on the basis of respective pixel data of 2×2 dots, and an input/output control section 36. The plurality of integrated circuits are arrayed to calculate interpolated value between respective pixels of a pixel block of 2n×2m dots.

11 Claims, 11 Drawing Sheets

IMAGE SIGNAL INTERPOLATING CIRCUIT FOR CALCULATING INTERPOLATED VALUES FOR VARYING BLOCK SIZES

BACKGROUND OF THE INVENTION

1. Field of the Invention

This invention relates to an image signal interpolating circuit adapted for calculating interpolated values between respective pixels on the basis of a plurality of pixel data.

2. Description of the Prior Art

Hitherto, in the case of transmitting image or picture data of a moving picture, for the purpose of reducing the quantity of data transmitted, a technique is frequently adopted to compress such data quantity using many methods. For example consider a case, as shown in FIG. 6, where a pictorial image of an arbitrary block $B_n$ comprised of a plurality of pixels (e.g., pixels of $8 \times 8$ dots) on a picture of a frame $F_n$ shifts or moves to the position of a block $B_{n+1}$ of a frame $F_{n+1}$. Pictures (pictorial images) of frames preceding and succeeding in time (frames $F_n$ and $F_{n+1}$) are compared with each other to detect so called a motion vector indicating a direction of movement and a quantity of movement from the block $B_n$ to the block $B_{n+1}$ to transmit information of the motion vector with respect to the picture of the block moved, thus to resultantly compress the quantity of data of moving pictures transmitted.

More particularly, as shown in FIG. 7, for example, is the case where it is detected by comparing two pictures each comprised of a plurality of pixels D as described above that a block, which was located at the position of Ba in a frame preceding in time (block having a size of $3 \times 3$ dots in the example of FIG. 7), has moved to the position of Bb in the subsequent frame. The above-mentioned motion vector $v(x, y)$ has components (or coordinates) expressed as $v(x, y) = (+3, -3)$. It is to be noted that a vector having such components as shown in FIG. 7 is called a vector of the integer precision.

Further, as shown in FIG. 8, for example, is the case where it is detected by comparing two pictures each comprised of a plurality of pixels D that a block, which was located at the position of Bc in the figure in a frame preceding in time (the size is $3 \times 3$ dots also in the example of FIG. 8), has moved the position of Bb in the figure in the subsequent frame. The motion vector $v(x, y)$ has components (or coordinate) expressed as $v(x, y) = (+2.5, -1.5)$. It is to be noted that a vector having such components as shown in FIG. 8 is called a vector of half pixel precision.

Meanwhile, in the case where such a compressive coding to transmit motion vector information along with image data is carried out, such motion vector information is used in decoding the compressive coding to construct a pictorial image of the block. Here, as shown in FIG. 8, for example, is the case where a motion vector of the half pixel precision is used to make up or construct a block of Bb in FIG. 8. An approach is employed to determine, by calculation, data constituting a block of Bc in FIG. 8 (interpolated values) from values of respective pixel data of a block having a size larger than that of the block Bc in FIG. 8 thereafter to make up or construct such block of Bb in FIG. 8.

When the above-mentioned block is assumed to be comprised of pixels of $8 \times 8$ dots, for example, an operational or computational processing as described below is required for making up a block having data of the half pixel precision (interpolated values).

For example, in the block of $8 \times 8$ dots, consider the case of determining data of the half pixel precision, i.e., interpolated values in a horizontal direction from respective pixel data in the horizontal direction. An approach is employed as shown FIG. 9 to add values of respective adjacent two pixel data of nine pixel data $D_{H1}, D_{H2}, \ldots, D_{H9}$ in the horizontal direction of a block of $9 \times 9$ dots. The block of $9 \times 9$ dots has a size larger than that of the block of $8 \times 8$ dots. In this way each of the added two pixel data can be divided by 2 to assume values thus obtained as interpolated values $d_{H1}, d_{H2}, \ldots d_{H8}$. Namely, in the case of determining interpolated values in the horizontal direction, an interpolated value $d_{H1}$ is determined or calculated from pixel data $D_{H1}$ and $D_{H2}$, an interpolated value $d_{H2}$ is determined from pixel data $D_{H2}$ and $D_{H3}$, an interpolated value $d_{H3}$ is determined from pixel data $D_{H3}$ and $D_{H4}$, an interpolated value $d_{H4}$ is determined from pixel data $D_{H4}$ and $D_{H5}$ an interpolated value $d_{H5}$ is determined from pixel data $D_{H5}$ and $D_{H6}$, an interpolated value $d_{H6}$ is determined from pixel data $D_{H6}$ and $D_{H7}$, an interpolated value $d_{H7}$ is determined from pixel data $D_{H7}$ and $D_{H8}$, and an interpolated value $d_{H8}$ is determined from pixel data $D_{H8}$ and $D_{H9}$. By repeatedly performing such an operation, 64 interpolated values in the horizontal direction can be provided in the block of $8 \times 8$ dots.

Further, in such a block of $8 \times 8$ dots, consider the case of determining or calculating interpolated values in a vertical direction from pixel data in the vertical direction. For example, an approach is employed as shown in FIG. 10 to add values of respective adjacent two pixel data in the vertical direction of picture data $D_{1H1}, D_{1H2}, \ldots, D_{1H8}$, and $D_{2H1}, D_{2H2}, \ldots, D_{2H8}$ arranged in two rows in a horizontal direction. Then this approach will divide the added values by 2 to assume the values thus obtained as interpolated values $d_{v1}, d_{v2}, \ldots, d_{v8}$. Namely, in FIG. 10, an interpolated value $d_{v1}$ is determined from pixel data $D_{1H1}$ and $D_{2H1}$, an interpolated value $d_{v2}$ is determined from pixel data $D_{1H2}$ and $D_{2H2}$, an interpolated value $d_{v3}$ is determined from pixel data $D_{1H3}$ and $D_{2H3}$, an interpolated value $d_{v4}$ is determined from pixel data $D_{1H4}$ and $D_{2H4}$, an interpolated value $d_{v5}$ is determined from pixel data $D_{1H5}$ and $D_{2H5}$, an interpolated value $d_{v6}$ is determined from pixel data $D_{1H6}$ and $D_{2H6}$, an interpolated value $d_{v7}$ is determined from pixel data $D_{1H7}$ and $D_{2H7}$, and an interpolated value $d_{v8}$ is determined from pixel data $D_{1H8}$ and $D_{2H8}$. By repeatedly performing such operations, 64 interpolated values in the vertical direction can be provided in the block of $8 \times 8$ dots.

Further, in such a block of $8 \times 8$ dots, in order to determine or calculate interpolated values from pixel data at intermediate positions in horizontal and vertical directions, for example, an approach is employed as shown in FIG. 11. This approach will add values of respective four pixel data adjacent in vertical and horizontal directions of pixel data $D_{1H1}, D_{1H2}, \ldots, D_{1H9}$, and $D_{2H1}, D_{2H2}, \ldots, D_{2H9}$. This pixel data is arranged in two rows in a horizontal direction of a block of $9 \times 9$ dots having a size larger than that of the block of $8 \times 8$ dots. This approach will divide the added values by 4 to assume the values thus obtained as interpolated values $d_{M1}, d_{M2}, \ldots, d_{M8}$. Namely, in FIG. 11, an interpolated value $d_{M1}$ is determined from pixel data $D_{1H1}, D_{1H2}$ and $D_{2H1}, D_{2H2}$, an interpolated value value $d_{M2}$ is determined from pixel data $D_{1H2}, D_{1H3}$ and $D_{2H2}, D_{2H3}$, an interpolated value $d_{M3}$ is determined from pixel data $D_{1H3}$, $D_{1H4}$ and $D_{2H3}$, $D_{2H4}$, an interpolated value $d_{M4}$ is determined from pixel data $D_{1H4}$, $D_{1H5}$ and $D_{2H4}$, $D_{2H5}$, an interpolated value $d_{M5}$ is determined from pixel data $D_{1H5}$, $D_{1H6}$ and $D_{2H5}$, $D_{2H6}$, an interpolated value $d_{M6}$ is determined from pixel data $D_{1H6}$, $D_{1H7}$ and $D_{2H6}$, $D_{2H7}$, an interpolated value $d_{M7}$ is determined from pixel data $D_{1H7}$, $D_{1H8}$ and $D_{2H7}$, $D_{2H8}$, and an interpolated value $d_{M8}$ is determined from pixel data $D_{1H8}$, $D_{1H9}$ and $D_{2H8}$, $D_{2H9}$. Thus, 64 interpolated values at intermediate positions in vertical and horizontal directions can be provided in the block of 8×8 dots.

As the configuration for determining or calculating interpolated values with the half pixel precision in a block of 8×8 dots as described above, there is known an image signal interpolating circuit as shown in FIG. 12, for example. It is to be noted that only the configuration for determining interpolated values in a horizontal direction shown in FIG. 9 is shown for the brevity of explanation. It is further to be noted that there is shown the example for determining interpolated values as stated above at the image signal interpolating circuit on the basis of image data and information read out from a recording medium on which motion vector information is recorded together with that image data.

In FIG. 12, motion vector information is recorded together with the image data on an optical disk 1, for example, as the recording medium. From this optical disk 1, data, recorded is read by a reading device 2. Image data read from the optical disk 1 is sent to a changeover switch 5. When the changeover switch 5 is switched to switched terminal a side, the image data is sent to, e.g., a frame memory 6, and is stored hereinto. This frame memory 6 carries out a write/read operation in accordance with write/read address data delivered from an address generator 4.

Here, the motion vector information of data from the optical disk 1 is detected by a motion vector detector 3. The motion vector information thus detected is sent to the address generator 4. At this address generator 4, on the basis of the motion vector information, readout address data is generated. This readout address is for reading out respective pixel data of a block designated by the motion vector information of image data stored in the frame memory 6.

The pixel data of the block thus read out is sent to a changeover switch 8. When switched terminal a of the changeover switch 8 is selected, the pixel data is transmitted to an image signal interpolating circuit 20 through a terminal 33. This image signal interpolating circuit 20 is comprised of a 9 bit shift register 21, an 8 bit shift register 23, an operational or computational elements 22 for performing additive operation and ½ operation (divisional operation by 2). Respective pixel data of the block delivered through the changeover switch 8 are serially delivered to the 9 bit shift register 21. The pixel data outputted in parallel from the 9 bit shift register 21 are respectively sent to eight operational or computational elements for carrying out an operational processing to add respective adjacent two pixel data in a horizontal direction (shown in FIG. 9 as described above) and to divide these added values by 2. Outputs from these operational or computational elements 22 are sent to the 8 bit shift register 23. Data indicative of operation results by the operational or computational elements 22 are serially outputted from the shift register 23. These data are outputted through a terminal 38.

Output of the shift register 23, i.e., data of respective interpolated values are stored for a second time into the frame memory 6, for example, through a changeover switch 9 of which switched terminal a side is selected. Write address data at this time is data based on the motion vector information from the address generator 4.

Image-interpolated image data stored in the frame memory 6, for example, in this way is sent to a monitor 11 through the changeover switch 8 of which switched terminal b side is selected and the changeover switch 10 of which switched terminal a side is selected. At the monitor 11, there is carried out an image display in which an image of the block is moved on the basis of the motion vector information.

Further, while a processing to determine or calculate interpolated values of data read from the optical disk 1 and stored into the frame memory 6, for example, is carried out as described above, data of the next frame is being read from the optical disk 1. The next frame data is stored into a frame memory 7 through the changeover switch 5 of which switched terminal b side is selected. Accordingly, after the processing for determining or calculating interpolated values of data stored in the frame memory 6 is completed, data stored in the frame memory 7 is sent to the image interpolating circuit 20 through the changeover switch 8 of which switched terminal b side is selected. After a processing similar to the above is carried out, processed data are sent to the monitor 11. It is to be noted that, at this time, the switched terminal b side of the changeover switch 9 and the switched terminal b side of the changeover switch 10 are selected.

By carrying out a processing like the so-called double buffer to repeatedly use two frame memories 6, 7, successive moving pictures are displayed on the monitor 11.

It is to be noted that, in connection with the configuration of FIG. 12, similar configurations (not shown) are required in addition to the FIG. 12 configuration in order to determine or calculate interpolated values in a vertical direction and interpolated values at intermediate positions in vertical and horizontal directions. Operational or computational elements of a structure for determining or calculating interpolated values at intermediate positions in vertical and horizontal directions are adapted to perform an operation to divide data delivered thereto by 4.

The above-described image signal interpolating circuit as shown in FIG. 12 requires a shift register (9 bit shift register 21 or 8 bit shift register 23) corresponding to the number of dots (e.g., 8×8 dots) of a block to be processed. Accordingly, in the case of attempting to change the size of this block, for example, design must be changed so that the image signal interpolating circuit is in correspondence with the size of the block to be changed. For this reason, cost for design (development cost) becomes high, and it is difficult to make up a widely usable image signal interpolating circuit capable of coping with various block sizes.

In addition, in the conventional image interpolating circuit, it takes much time for processing for interpolative operation, so it is difficult to carry out high speed processing.

OBJECTS AND SUMMARY OF THE INVENTION

With the above in view, an object of this invention is to provide an image signal interpolating circuit which can determine or calculate interpolation values of blocks of various sizes, which is permitted to be widely used, and which is inexpensive and is operable at a high speed.

To achieve the above-mentioned object, according to one aspect of this invention, there is provided an image signal interpolating circuit comprising a plurality of integrated circuit each including therein a memory for holding pixel data of 2×2 dots, an interpolative operation circuit for calculating interpolated values on the basis of respective pixel data of 2×2 dots, and control means for controlling input/output of the pixel data. The plurality of integrated circuits are arrayed to calculate interpolated values between respective pixels of a block comprised of pixels of 2n×2m dots (n and m are positive integers).

The integrated circuit may include a control terminal, an input terminal, and an output terminal. The integrated circuit of such a structure may further include a first selector for helping to selectively store pixel data inputted from the input terminal into the memory, and a second selector for selectively outputting either pixel data from the memory or pixel data from the interpolative operation circuit to the output terminal. In this case, it is preferable that pixel data from the memory or the pixel data from the output terminal is caused to be data of the integer precision, and pixel data from the interpolative operation circuit thereof is caused to be data of the half pixel precision. The interpolative operation circuit may operate as follows: In the case of calculating an interpolated value of two pixels adjacent in a horizontal direction, the interpolative operation circuit carries out a processing to add pixel data adjacent in a horizontal direction to divide the added value by 2; in the case of calculating an interpolated value of two pixels adjacent in a vertical direction, the interpolative operation circuit carries out a processing to add pixel data adjacent in the vertical direction to divide the added value by 2; and in the case of calculating interpolated values at intermediate positions of four pixels adjacent in vertical and horizontal directions, the interpolative operation circuit carries out a processing to add these four pixel data to divide the added value by 4. This image signal interpolating circuit may be utilized for a processing to decode image data by motion vectors of the image data.

According to a second aspect of this invention, there is provided an image signal decoding apparatus comprising the image signal interpolating circuit featured by the first aspect, a reading circuit for reading image data and motion vector information from a memory medium, a frame memory for storing image data thus read, a detector for detecting the motion vector information, and a control circuit. The control circuit is for generating control signals for the frame memory and the image signal interpolating circuit. These control signals are generated on the basis of motion vector information from the detector and image data from the frame memory being decoded by the image signal interpolating circuit. The memory medium is preferably an optical disk. The frame memory may store, for a second time, the image data subjected to the processing by the image signal interpolating circuit, and deliver that image data to a display device.

DESCRIPTION OF THE PREFERRED EMBODIMENTS

Figure 1:
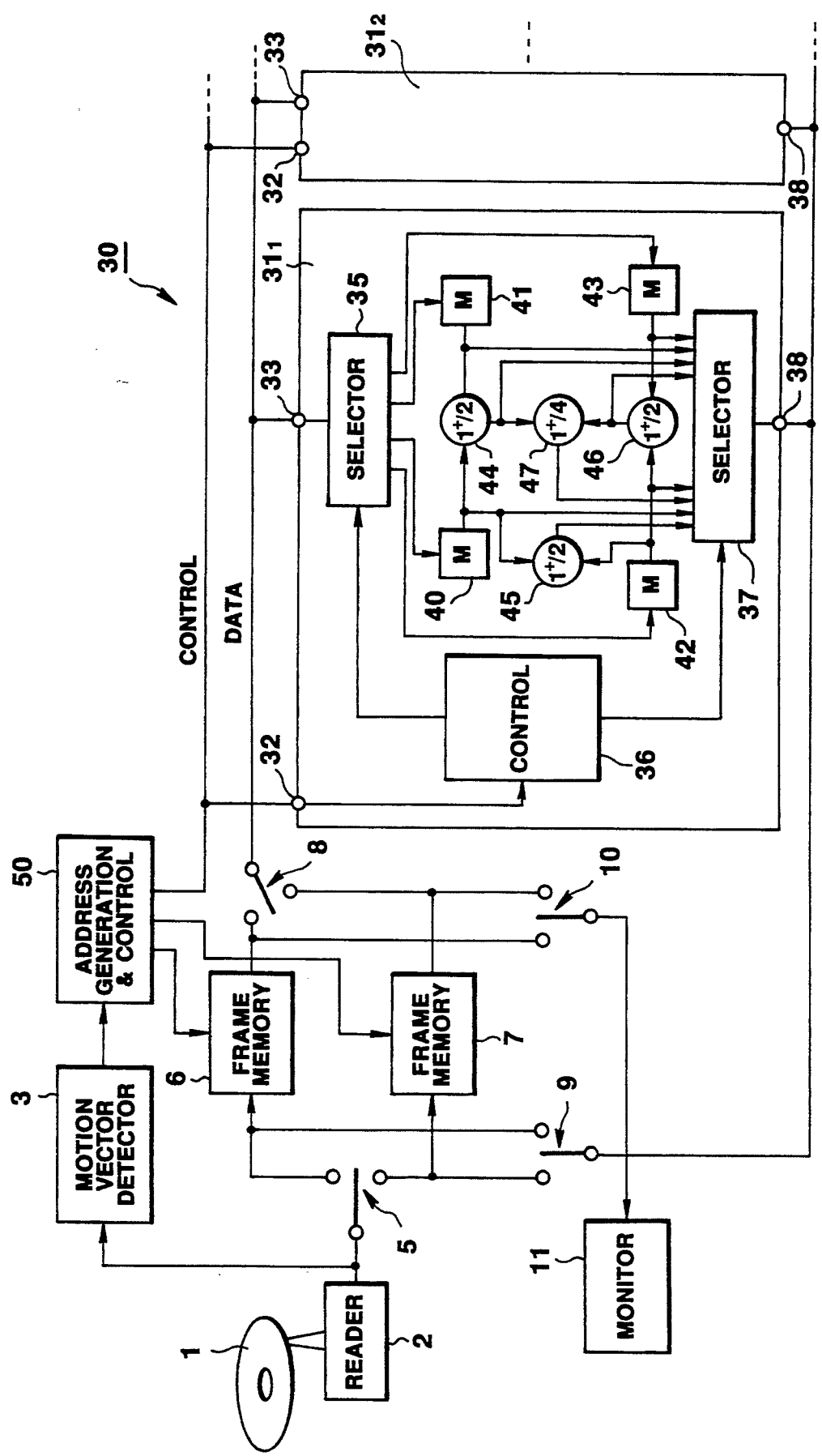
FIG. 1 is a block diagram showing the outline of the configuration of an image signal interpolating circuit of a first embodiment according to this invention.

Preferred embodiments to which this invention is applied will now be described with reference to the attached drawings.

An image signal interpolating circuit 30 of a first embodiment is directed to an image signal interpolating circuit adapted for calculating interpolated values between respective pixels of an image of a block constituted by pixels of a plurality of dots. Namely, this image signal interpolating circuit 30 is of a structure of an array comprised of a plurality of integrated circuits 31 ($31_1$, $31_2$, . . . ), thus to provide interpolated values between respective pixels of a block constituted by pixels of 2n×2m dots. Each integrated circuit 31 comprises four memories 40, 41, 42, 43 for holding pixel data of one dot serving as memory means for holding pixel data of 2×2 dots, operational or computational elements 44, 45, 46, 47 serving as interpolative operation means for calculating interpolated values on the basis of respective pixel data of 2×2 dots, and a control section 36 for controlling input/output.

Figure 12:
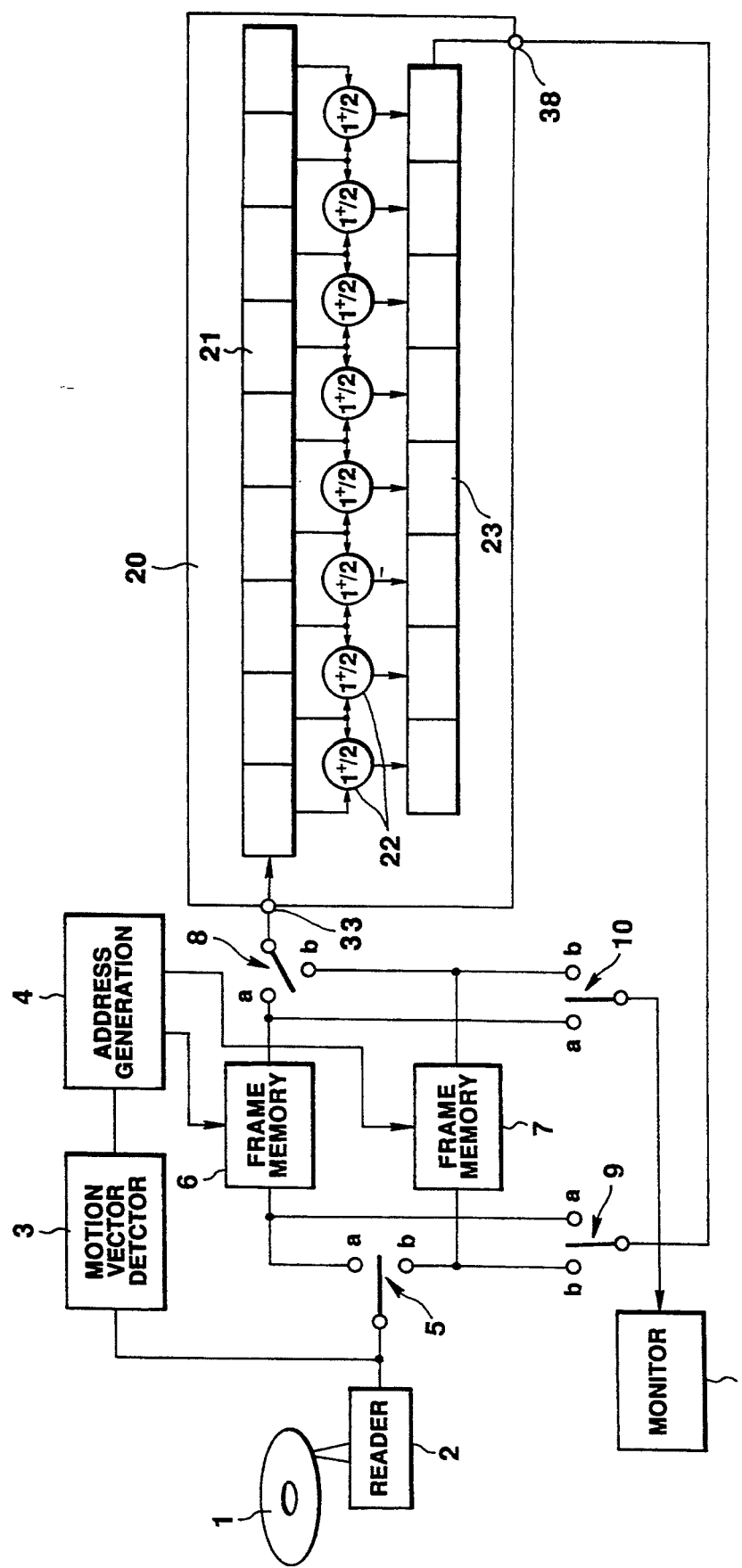
FIG. 12 is a block diagram showing the outline of a conventional image signal interpolating circuit.

It is to be noted that the same reference numerals are respectively attached to the same components as those of the previously described circuit shown in FIG. 12, and explanation of their operations is omitted here. Further, in this embodiment, explanation will be given in connection with the example where the block of pixel data has, e.g., 8×8 dots (i.e., 2n×2m=8×8).

Namely, motion vector information from the motion vector detector 3 is sent to a control circuit 50 adapted to generate write/read address data into and from the previously described frame memories 6, 7, and to form control signals sent to respective control sections 36 of the integrated circuits $31_1$, $31_2$, ... ($31_1$ to $31_8$ in this embodiment). Such control signals from the control circuits 50 are sent to the control sections 36 through terminals 32 of the integrated circuits, respectively.

Figure 10:
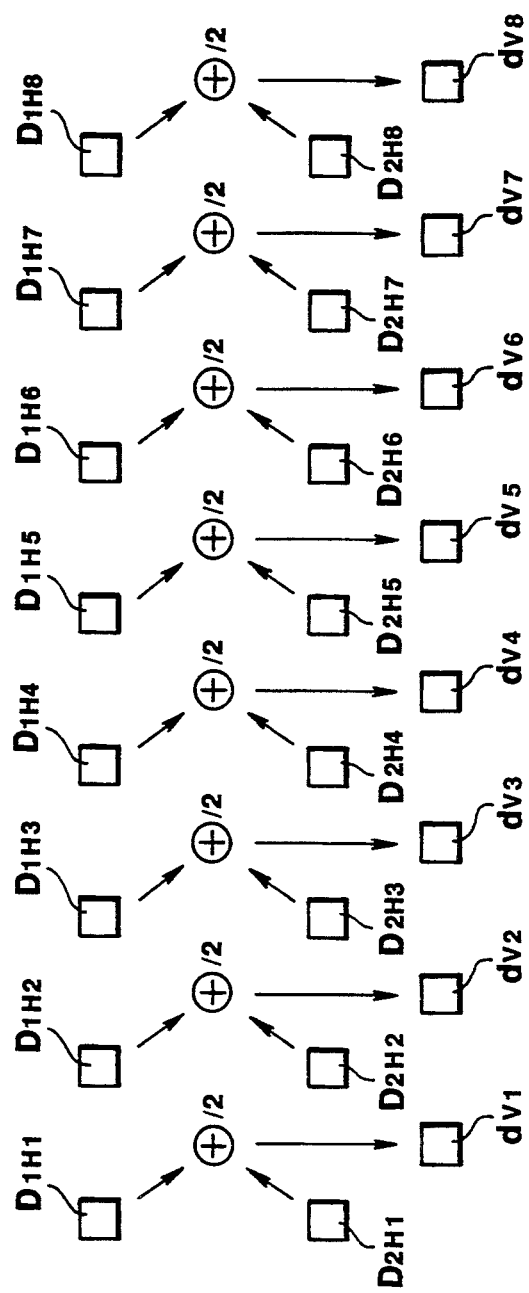
FIG. 10 is a view for explaining interpolative operation in a vertical direction.
Figure 11:
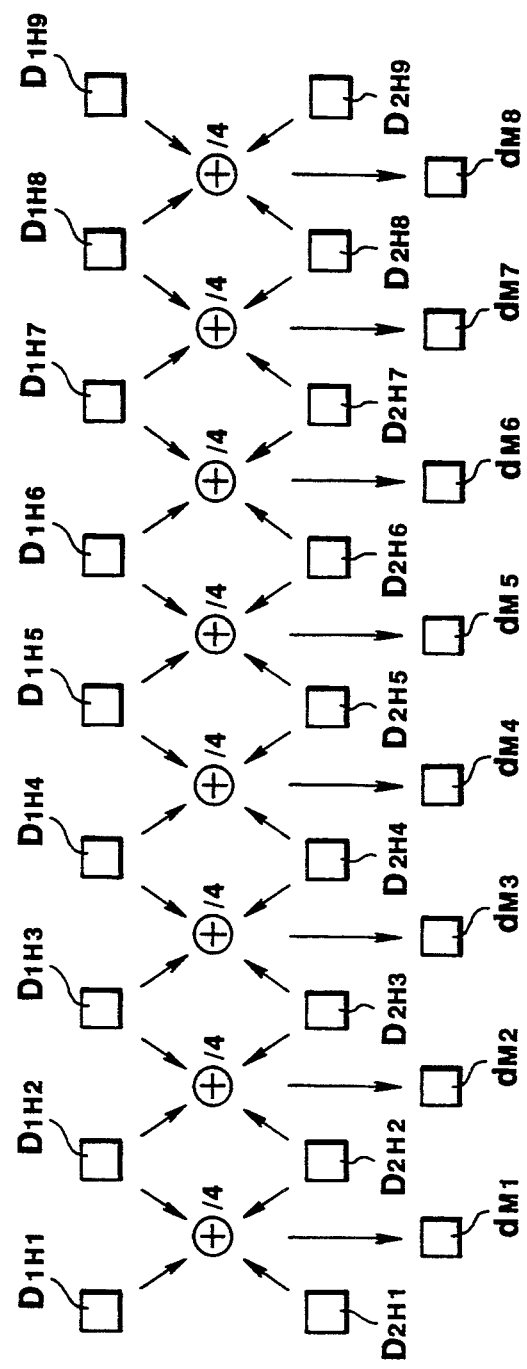
FIG. 11 is a view for explaining interpolative operation in horizontal and vertical directions.

To terminals 33 of the image signal interpolating circuit 30, respective pixel data of a block from the previously described frame memory 6 or 7, for example, are delivered. These respective pixel data are sent to each selector 35. This selector 35 serves to selectively output pixel data delivered thereto in dependency upon a switching signal from the control section 36 operative in accordance with the control signal. Namely, this selector 35 serves to selectively output the previously described four pixel data adjacent in horizontal and vertical directions as shown in FIG. 10 or FIG. 11 to corresponding memories 40 to 43, respectively. For example, the selector 35 is adapted to output adjacent pixel data in line of the upper row of FIG. 10 or 11 to the memories 40, 41, and to output adjacent pixel data in line of the lower row of FIG. 11 to the memories 42, 43.

Pixel data can be stored into, e.g., memories 40 to 43 of the integrated circuit $31_1$ as follows. In the case where, e.g., the above-mentioned data $D_{1H1}$ is stored into the memory 40, data $D_{1H2}$ is stored into the memory 41, data $D_{2H1}$ is stored into the memory 42, and data $D_{2H2}$ is stored into the memory 43. At this time, in the integrated circuit $31_2$ (shown in block form only) the data $D_{1H2}$ is stored into the memory 40, data $D_{1H3}$ is stored into the memory 41, data $D_{2H2}$ is stored into the memory 42, and data $D_{2H3}$ is stored into the memory 43. Further, in the integrated circuit $31_3$ (not shown), the data $D_{1H3}$ is stored into the memory 40, data $D_{1H4}$ is stored into the memory 41, data $D_{2H3}$ is stored into the memory 42, and data $D_{2H4}$ is stored into the memory 43. In a manner similar to the above, in respective integrated circuits up to the integrated circuit $31_8$, the same data as that of the memory 41 of an integrated circuit of the preceding stage will be stored into the memory 40, and the same data as that of the memory 43 of an integrated circuit of the preceding stage will be stored into the memory 42.

Further, the operational or computational element 44 is supplied with outputs of the memories 40 and 41, the operational or computational element 45 is supplied with outputs of the memories 40 and 42, the operational or computational element 46 is supplied with outputs of memories 42 and 43, and the operational or computational element 47 is supplied with outputs of the operators 44 and 46. Here, these operational or computational elements 44 to 46 serve to carry out a processing to add data delivered thereto to divide the added data by 2, and the operational or computational element 47 serves to add data delivered thereto to divide the added data by 4.

Accordingly, in the integrated circuit $31_1$: at the operational element 44, an operational processing to add data $D_{1H1}$ and $D_{1H2}$ from the memories 40 and 41 to divide the added data by 2 is carried out; at the operational element 45, an operational processing to add data $D_{1H1}$ and $D_{2H1}$ from the memories 40 and 42 to divide the added data by 2 is carried out; at the operational element 46, an operational processing to add data $D_{2H1}$ and $D_{2H2}$ from the memories 42 and 43 to divide the added data by 2 is carried out; and at the operational element 47, an operational processing to add data $(D_{1H1}+D_{1H2})/2$ from the operational element 44 and data $(D_{2H1}+D_{2H2})/2$ from the operational element 46 to divide the added data by 4 is carried out. In a manner similar to the above, at respective operational elements of the integrated circuits $31_2$ to $31_8$, operational processing of respective data stored in the respective memories 40 to 43 are carried out. Outputs from these respective operational elements serve as data of interpolated values.

Further, outputs of respective operational or computational elements 44 to 47 are sent to the selector 37 subjected to switching control by the control section 36. Furthermore, outputs of the respective memories 40 to 43 are also sent to the selector 37. At this selector 37, a processing to select data of respective interpolated values and respective pixel data delivered thereto in accordance with the switching signal corresponding to the control signal is carried out.

An output of this selector 37 is sent to the changeover switch 9 through the terminal 38. Namely, respective image data obtained from the terminals 38 of respective integrated circuits $31_1$ to $31_8$ as described above serve as data of the integer precision, and data of interpolated values obtained therefrom serve as data of the half pixel precision.

Accordingly, as described above, in accordance with this embodiment, the image signal interpolating circuit is constructed as an array comprised of a plurality of integrated circuits 31, each integrated circuit comprising memories 40, 41, 42, 43 for holding pixel data of 2×2 dots, operational or computational elements 44, 45, 46, 47 for calculating interpolated values on the basis of respective pixel data of 2×2 dots, and control section 36 for controlling input/output. By electrically connecting these plurality of integrated circuits 31, it is possible to cope with blocks of various sizes, i.e., blocks of pixels of 2n×2m dots. Further, by only electrically connecting integrated circuits 31, it is possible to make up a widely used image signal interpolating circuit capable of coping with various blocks. Accordingly, since there is no necessity of changing design in correspondence with the size of a block, the cost for design (development cost) is inexpensive. Furthermore, by only electrically connecting these integrated circuit 31, it is possible to calculate interpolated values of both the integer precision and the half pixel precision with respect to the horizontal direction and the vertical direction. In addition, since the readout time for memories 40 to 43 is only a relatively short delay time, it is unnecessary to specially set a time required for processing for interpolative operation, thus making it possible to carry out high speed processing.

A second embodiment of an image signal interpolating circuit according to this invention will now be described with reference to FIGS. 2 to 4. It is to be noted that explanation will be given by taking an example of a block of 3×3 dots for brevity of explanation. Further, in the second embodiment, there is shown the example where interpolated values at intermediate positions in horizontal and vertical directions are calculated.

Figure 2:
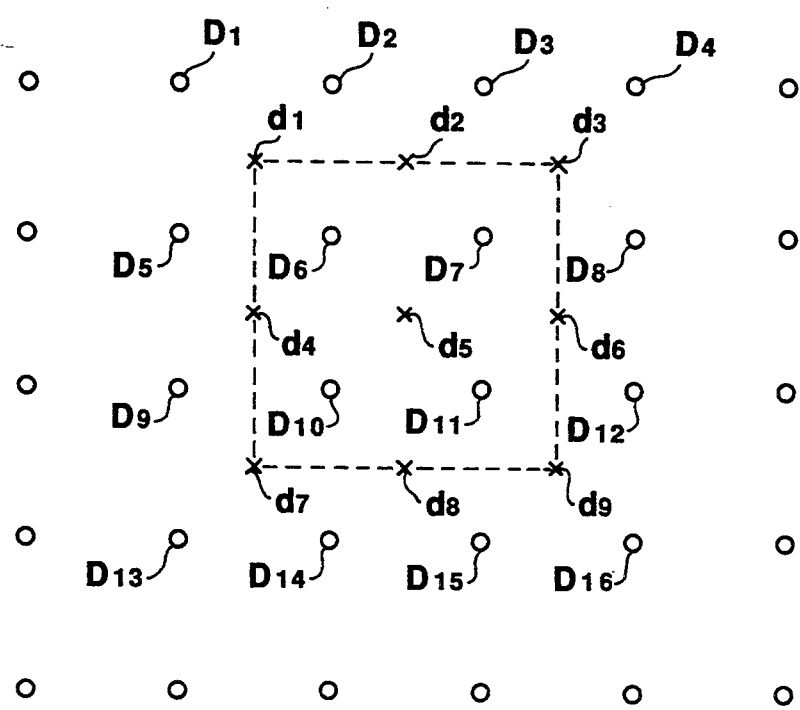
FIG. 2 is a view for explaining interpolated values of a second embodiment according to this invention.

In FIG. 2, in order to calculate interpolated values of respective pixels of a block of 3×3 dots, pixel data $D_1$, $D_2$, $D_3$, ..., $D_{16}$ of a block of 4×4 dots having a size larger than that of the block of 3×3 dots are used. Namely, in order to calculate interpolated values $d_1$, $d_2$, $d_3$, ..., $d_9$ of the block of 3×3 dots, operations expressed by the following equations (1) to (9) are carried out.

$$d_1 = (D_1 + D_2 + D_5 + D_6)/4 \qquad (1)$$

$$d_2 = (D_2 + D_3 + D_6 + D_7)/4 \quad (2)$$

$$d_3 = (D_3 + D_4 + D_7 + D_8)/4 \quad (3)$$

$$d_4 = (D_5 + D_6 + D_9 + D_{10})/4 \quad (4)$$

$$d_5 = (D_6 + D_7 + D_{10} + D_{11})/4 \quad (5)$$

$$d_6 = (D_7 + D_8 + D_{11} + D_{12})/4 \quad (6)$$

$$d_7 = (D_9 + D_{10} + D_{13} + D_{14})/4 \quad (7)$$

$$d_8 = (D_{10} + D_{11} + D_{14} + D_{15})/4 \quad (8)$$

$$d_9 = (D_{11} + D_{12} + D_{15} + D_{16})/4 \quad (9)$$

Figure 3:
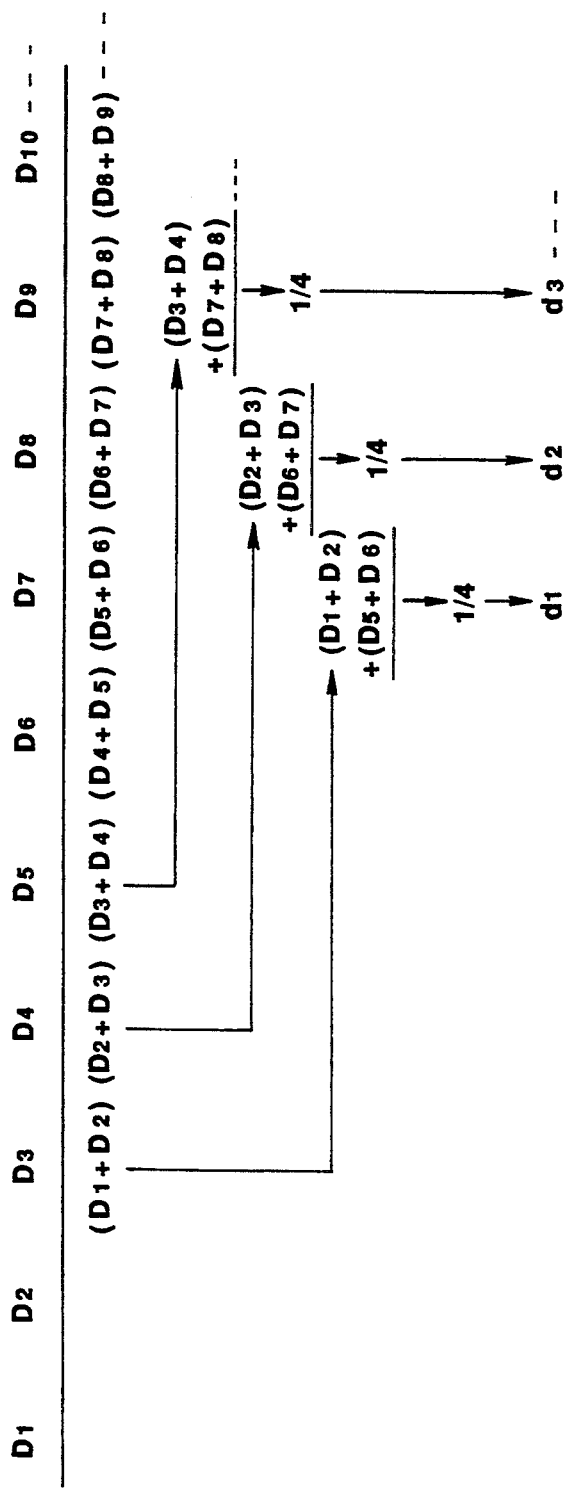
FIG. 3 is a view for explaining operation in determining or calculating interpolated values of the second embodiment.

In other words, when pixel data are assumed to be delivered in order of $D_1, D_2, D_3, \ldots, D_{16}$, interpolated values $d_1, d_2, d_3, \ldots, d_9$ can be calculated by performing an operation as shown in FIG. 3. Namely, in FIG. 3, by carrying out operational processing of $(D_1+D_2)$, $(D_2+D_3)$, $(D_3+D_4)$, $(D_4+D_5)$, $(D_5+D_6)$, $(D_6+D_7)$, $(D_7+D_8)$, $(D_8+D_9), \ldots$, and by carrying out operational processing to add $(D_1+D_2)$ and $(D_5+D_6)$ to divide the added value by 4, operational processing to add $(D_2+D_3)$ and $(D_6+D_7)$ to divide the added value by 4, operational processing to add $(D_3+D_4)$ and $(D_6+D_7)$ to divide the added value by 4, ..., interpolated values $d_1, d_2, d_3, \ldots, d_9$ can be calculated.

Figure 4:
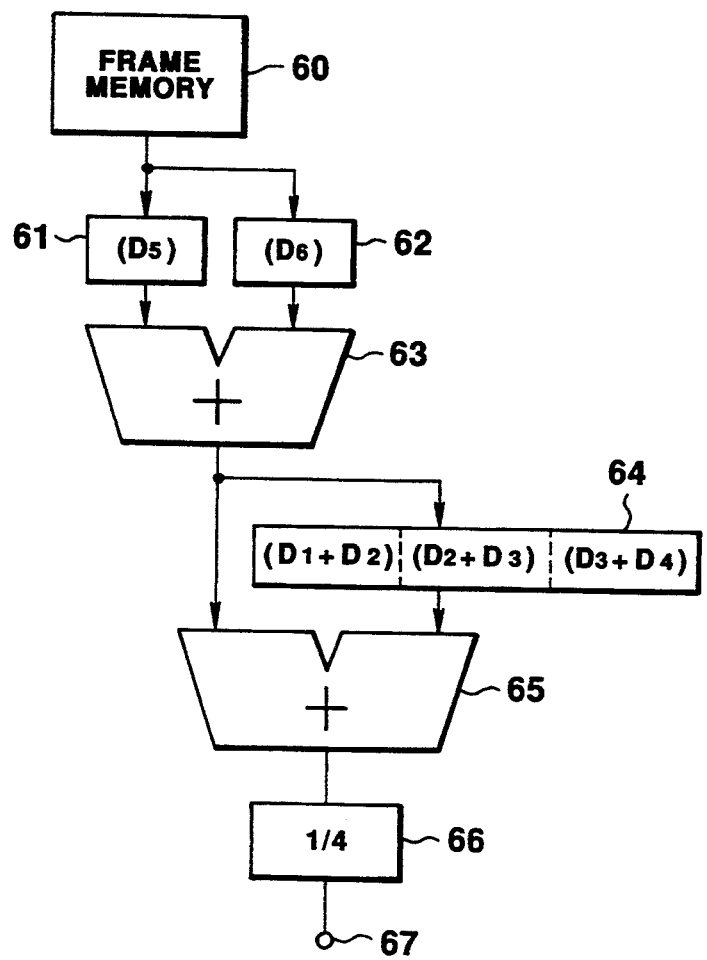
FIG. 4 is a block diagram showing the outline of the configuration of an image signal interpolating circuit of the second embodiment.

As the configuration for carrying out processing as shown in FIGS. 2 and 3, there can be enumerated a configuration as shown in FIG. 4, for example.

Namely, in FIG. 4, from a frame memory 60 (similar to the previously described respective frame memories 6, 7 of FIG. 1, for example), pixel data are read out in order shown in FIG. 3. These pixel data are sent to buffer memories 61, 62. In this instance, the buffer memory 61 operates as a buffer memory with respect to e.g., odd (or even) data of data read out from the frame memory 60, and the buffer memory 62 operates as a buffer memory with respect to, e.g., even (or odd) data of data read out from the frame memory 60. Outputs from these buffer memories 61, 62 are sent to a 2-input adder 63, at which they are added. Thus, operation results of $(D_1+D_2)$, $(D_2+D_3)$, $(D_3+D_4)$, $(D_4+D_5)$, $(D_5+D_6)$, $(D_6+D_7)$, $(D_7+D_8)$, $(D_8+D_9)$, ... as shown in FIG. 3 are outputted. An output of the adder 63 is delivered to one input terminal of a 2-input adder 65, and is also sent to a temporary memory 64.

This temporary memory 64 serves to store, e.g., three output data of the adder 63, and to output them in order of inputting. Namely, at the temporary memory 64, data of $(D_1+D_2)$, $(D_2+D_3)$, $(D_3+D_4)$ outputted from the adder 63 are stored, and these data are read out in order of inputting. Thereafter, data of $(D_5+D_6)$, $(D_6+D_7)$, $(D_7+D_8)$ are stored, and these data are read out in order of inputting. Then, data of $(D_9+D_{10})$, $(D_{10}+D_{11})$, $(D_{11}+D_{12})$ are stored, and these data are read out in order of inputting. In addition, data of $(D_{13}+D_{14})$, $(D_{14}+D_{15})$, $(D_{15}+D_{16})$ are stored, and these data are read out in order of inputting.

Accordingly, at the time when data are sequentially read out from the frame memory 60, data $D_5$ is outputted from the buffer memory 61, and data $D_6$ is outputted from the buffer memory 62, data of $(D_1+D_2)$ is outputted from the temporary memory 64. For this reason, at the adder 65, data of $(D_5+D_6)$ from the adder 63 and data of $(D_1+D_2)$ from the temporary memory 64 are added. Further, at the time when data $D_7$ is outputted from the buffer memory 61, and data $D_8$ is outputted from the buffer memory 62, data of $(D_2+D_3)$ is outputted from the temporary memory 64. Thus, at the adder 65, additive operation of these data is performed. Since operations similar to the above are performed at times subsequent thereto, their explanation is omitted here. An output of the adder 64 is divided by 4 by a divider 66. As the result of the fact that processing as described above is carried out, interpolated values are provided in order of $d_1$, $d_2$, $d_3$, ... from terminal 67.

It is to be noted that when, in FIG. 4, the temporary memory employs a memory comprised of the 8 byte, it is possible to obtain interpolated values of a block of $8 \times 8$ dots, for example.

Figure 5:
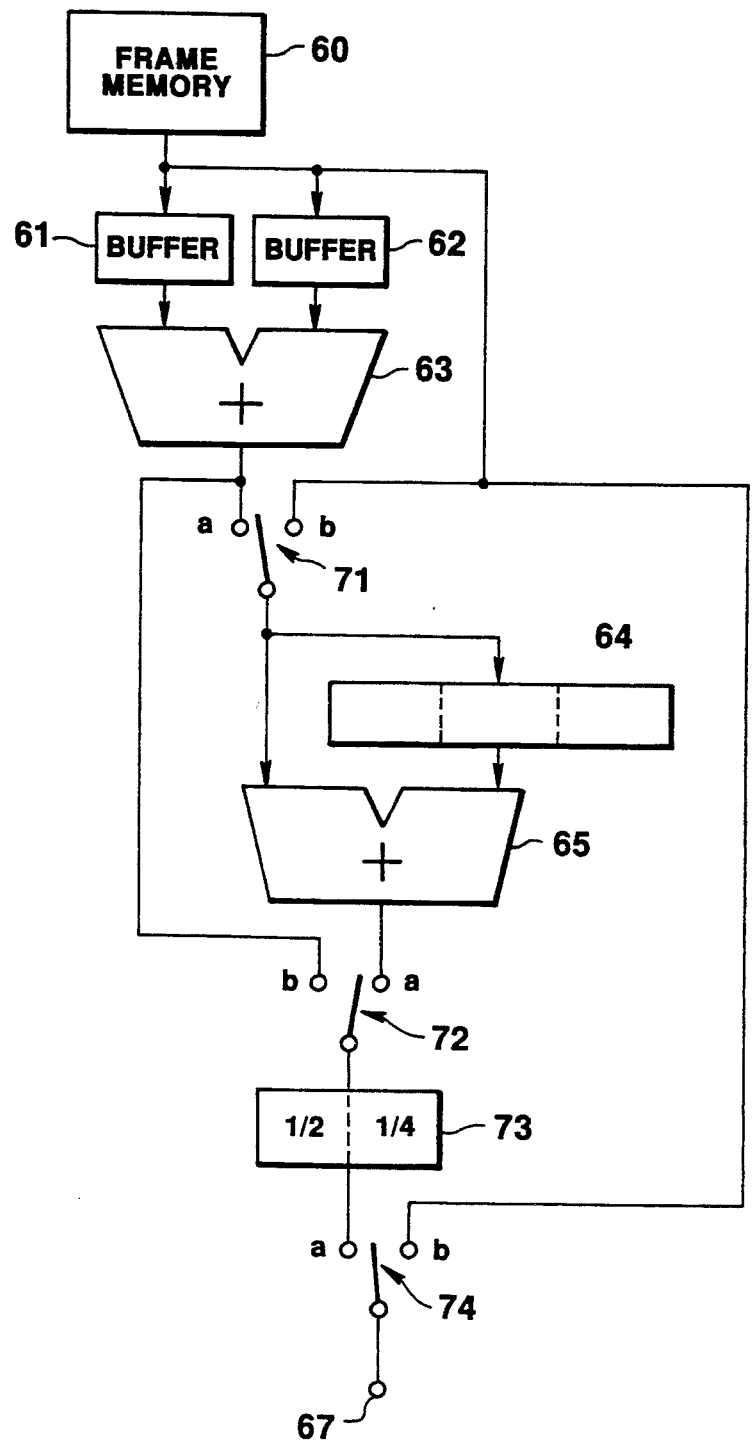
FIG. 5 is a block diagram showing the configuration for calculating interpolated values of the half pixel precision and/or the integer precision in horizontal and vertical directions in the circuit of the second embodiment.
Figure 6:
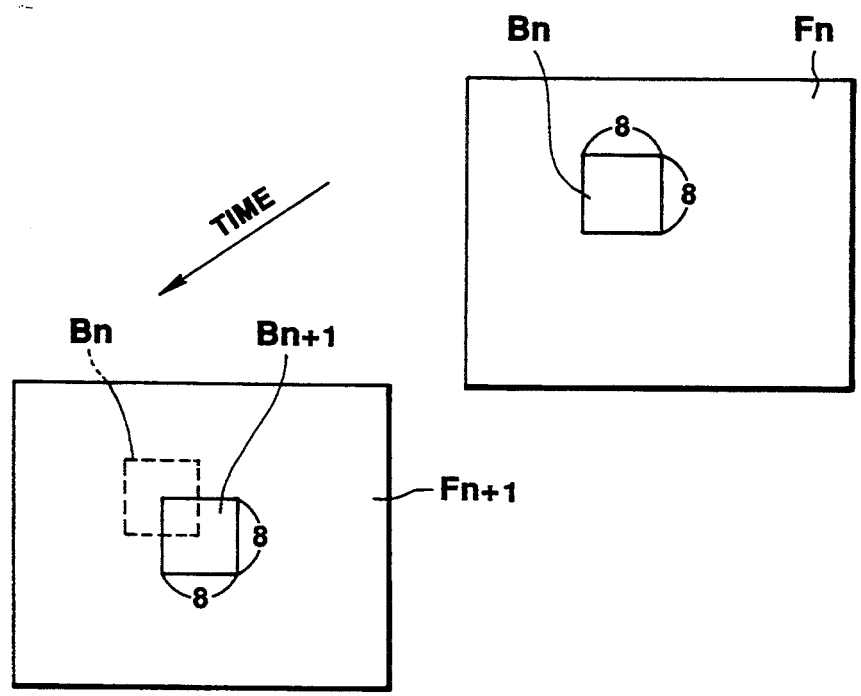
FIG. 6 is a a view for explaining blocks and the motion vector.
Figure 7:
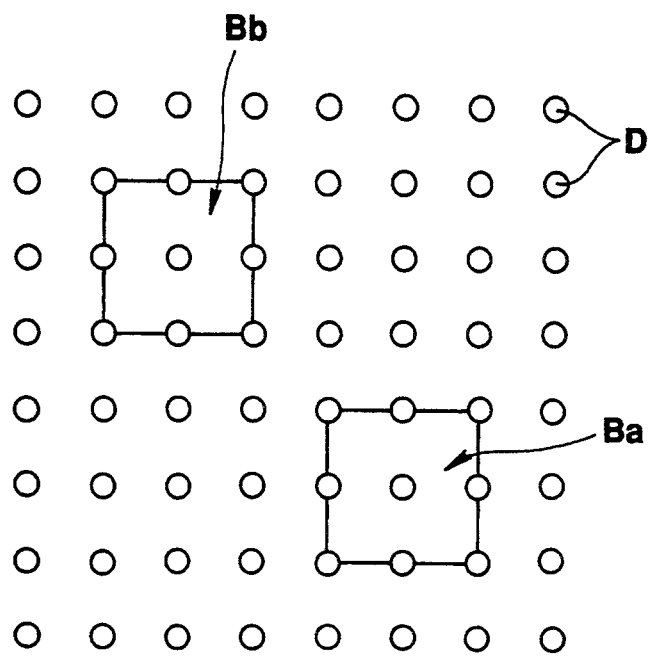
FIG. 7 is a view for explaining the integer precision.
Figure 8:
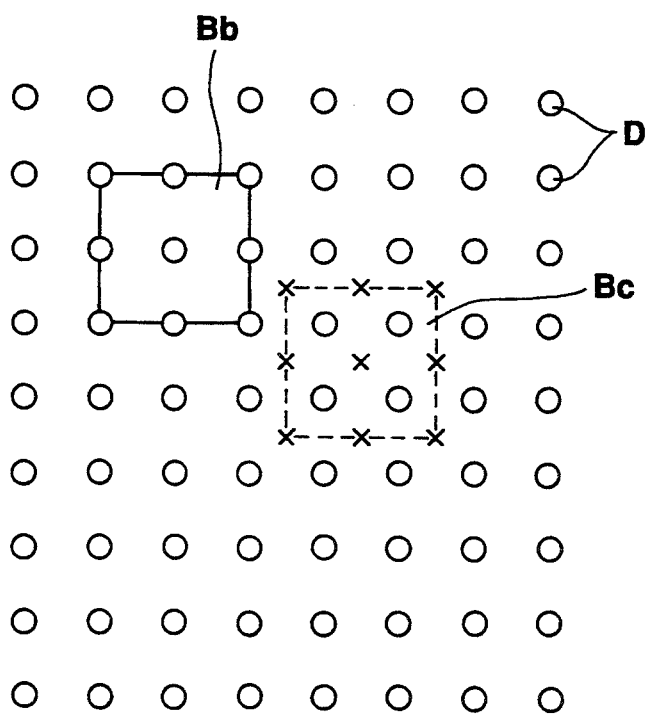
FIG. 8 is a view for explaining the half pixel precision.
Figure 9:
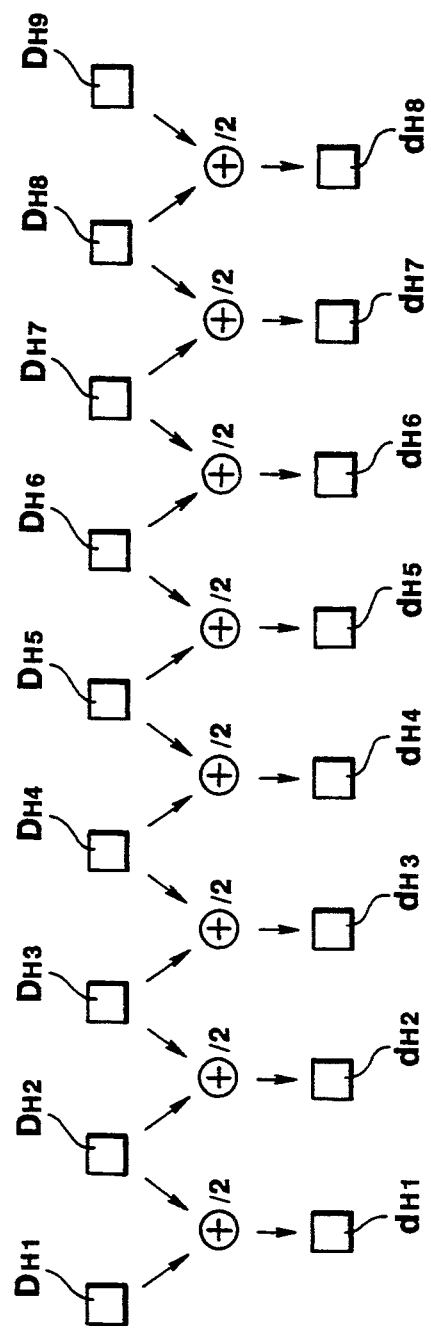
FIG. 9 is a view for explaining interpolative operation in a horizontal direction.

While the above-described configuration of FIG. 4 is directed to the example where interpolative operation is performed with the half pixel precision in horizontal and vertical directions, there may be employed a configuration as shown in FIG. 5, which is adapted to carry out interpolative operation with the integer precision and the half pixel precision with respect to the horizontal direction (x-direction) and the vertical direction (Y-direction). It is to be noted that, in FIG. 5, the same reference numerals are respectively attached to the same components as those of FIG. 4, their explanation will be omitted.

In FIG. 5, data from the frame memory 60 is sent to buffer memories 61, 62, and is also sent to the switched terminal b of a changeover switch 71 and the switched terminal b of a changeover switch 74. The switched terminal a of the changeover switch 71 is supplied with an output of the adder 63. Further, the output terminal of the adder 63 is also connected to the switched terminal b of a changeover switch 72. Moreover, the switched terminal a of the changeover switch 72 is connected to the output terminal of the adder 65. Further, the output terminal of the changeover switch 72 is connected to an operational element 73. This operational element 73 serves to carry out selective switching between division by 2 and division by 4 to execute a selected divisional operation. The output terminal of the operational element, 73 is connected to the switched terminal a of the changeover switch 74. The output terminal of this changeover switch 74 connected to the terminal 67.

Here, in the case of determining or calculating interpolated values with the half pixel precision in an x-direction (horizontal direction) and the half pixel precision in a y-direction (vertical direction), switched terminals a of the changeover switches 71, 72 and 74 are all selected. At this time, the path of data from the frame memory 60 up to the changeover switch 72 is the same as that of FIG. 4. In addition, the operational element 73 of the succeeding stage of the adder 65 is control led so as to carry out division by 4 similar to that of FIG. 4.

Further, in the case of calculating interpolated values with the half pixel precision in the x-direction (horizontal direction), and the integer precision in the y-direction (vertical direction), the switched terminal b of the changeover switch 72 is selected, and the switched terminal a of the changeover switch 74 is selected. It is to be noted that the changeover switch 71 may arbitrarily select either the switched terminal a of b. At this time, an output of the adder 63 is sent to the operational element 73 without being passed through the temporary memory 64 and the adder 65. At the operational element 73, operation of division by 2 is carried out. Accordingly, at the operational element 73, an operation to divide, by 2, operation results of $(D_1+D_2)$, $(D_2+D_3)$, $(D_3+D_4)$, $(D_4+D_5)$, $(D_5+D_6)$, $(D_6+D_7)$, $(D_7+D_8)$, $(D_5+D_9)$, ... is carried out. Thus, interpolated results with the half pixel precision in the x-direction and the integer precision in the y-direction are provided from the terminal 67.

Further, in the case of calculating interpolated values with the integer precision in the x-direction (horizontal direction) and the half pixel precision in the y-direction (vertical direction), the switched terminal b of the changeover switch 71 is selected, the switched terminal a of the changeover switch 72 is selected, and the switched terminal a of the changeover switch 74 is selected. At this time, an output of the frame memory 60 is directly sent to the temporary memory 64 and the adder 65 without being passed through the buffers 61, 62 and the adder 63. At the operator 73, an operation to divide data delivered thereto by 2 is carried out. In this case, at the temporary memory 64, data of $D_1$, $D_2$, $D_3$ outputted from the frame memory 60 are first stored, and these data are read out in order of inputting. Thereafter, data of $D_4$, $D_5$, $D_6$ are stored, and these data are read out in order of inputting. Then, data of $D_7$, $D_8$, $D_9$ are stored, and these data are read out in order of inputting. Further, data of $D_{10}$, $D_{11}$, $D_{12}$ are stored, and these data are read out in order of inputting. At times subsequent thereto, in a manner similar to the above, write-/read operations up to data $D_{16}$ are carried out.

Accordingly, at the time when data $D_4$ is outputted from the frame memory 60, data of $D_1$ is outputted from the temporary memory 64. For this reason, at the adder 65, data $D_4$ from the frame memory 60 and data of $D_1$ from the temporary memory 64 are added. Further, at the time when data $D_5$ is outputted from the frame memory 60, data of $D_2$ is outputted from the temporary memory 64. For this reason, such additive operations are performed at the adder 65. Since operations similar to the above are performed at time subsequent thereto, their explanation will be omitted. An output of the adder 64 is divided by 2 by the operational element 66. Thus, interpolated values with the integer precision in the x-direction and the half pixel precision in the y-direction are provided.

In addition, in the case of calculating interpolated values with the integer precision in the x-direction (horizontal direction) and the integer precision in the y-direction (vertical direction), the switched terminal b of the changeover switch 74 is selected. It is to be noted that the connecting states of the changeover switches 71, 72 and the operator 73 are arbitrary. At this time, an output of the frame memory 60 is sent to the terminal 67 directly through the changeover switch 74 without being passed through the buffers 61, 62, the adder 63, the temporary memory 64, the adder 65, and the operational element 73. Thus, interpolated values with the integer precision both in the x-direction and in the y-direction are provided from the terminal 67.

The state of the switching control of respective changeover switches 71, 72, 74 and the operational element 73 in the case of performing operations with the integer precision and/or the half pixel precision in the horizontal direction (x-direction) and in the vertical direction (y-direction) in FIG. 5 is shown in Table 1.

It is to be noted that, also in the above-described configuration of FIG. 5, when the temporary memory 64 is comprised of 8 bytes or 9 bytes, it is possible to provide interpolated values of a block of $8 \times 8$ (or $9 \times 9$) dots, for example. Further, in the above Table 1, the number of data read out from the frame memory 60 in the case of calculating interpolated values of a block of $8 \times 8$ dots, etc. is indicated together in Table 1.

TABLE 1

|  |  | SWITCH 71 | SWITCH 72 | SWITCH 74 | OPERATION ELEMENT 73 | READ-OUT |
|---|---|---|---|---|---|---|
| HALF PIXEL IN X-DIRECTION | HALF PIXEL IN Y-DIRECTION | TERMINAL a | TERMINAL a | TERMINAL a | $\frac{1}{4}$ | $9 \times 9$ |
|  | INTEGER IN Y-DIRECTION | * | TERMINAL b | TERMINAL a | $\frac{1}{2}$ | $9 \times 8$ |
| INTEGER IN X-DIRECTION | HALF PIXEL IN X-DIRECTION | TERMINAL b | TERMINAL a | TERMINAL a | $\frac{1}{2}$ | $8 \times 9$ |
|  | INTEGER IN X-DIRECTION | * | * | TERMINAL b | * | $8 \times 8$ |

As described above, in the examples of the actual circuit configurations of the second embodiment, since the temporary memory 64 is only required to have a capacity of one line within a block (only 8 bytes in the case of a block of $8 \times 8$ dots, for example). Accordingly, the configuration is relatively small.

As is clear from the foregoing description, an image signal interpolating circuit according to this invention may include a plurality of integrated circuits each including therein a memory for holding pixel data of $2 \times 2$ dots, an interpolative calculation circuit for calculating interpolated values on the basis of respective pixel data of $2 \times 2$ dots, and control means for controlling input-/output of the pixel data. The plurality of integrated circuits are arrayed to calculate interpolated values between respective pixels of a block comprised of pixels of $2n \times 2m$ dots. Thus, this image signal interpolating circuit can be widely used in such a manner to permit interpolated values between pixels in blocks of various sizes to be calculated, and is adapted so that it inexpensive and is operable at a high speed.

Further, an image signal decoding apparatus may include the image signal interpolating circuit featured above, a reading circuit for reading image data and motion vector information from a memory medium, a frame memory for storing image data thus read, a detector for detecting the motion vector information, and a control circuit for generating control signals. The control signals are generated for the frame memory and the image signal interpolating circuit on the basis of motion vector information from the detector. The image signal decoding apparatus can decode image data from the frame memory by the image signal interpolating circuit. Thus, the image signal interpolating circuit can be utilized for a processing to decode image data by motion vectors of the image data.

What is claimed is:

1. An image signal interpolating circuit for use in an image signal decoding apparatus, the image signal interpolating circuit comprising:
   a first memory, second memory, third memory and fourth memory for storing pixel data of 2×2 pixels, with each of the first, second, third and fourth memories storing pixel data of at least one pixel;
   an interpolative operation circuit for calculating interpolated values on the basis of respective pixel data of 2×2 pixels stored in the first, second, third and fourth memories; and
   control means for controlling input of the pixel data to the image signal interpolating circuit and output of interpolated values from the interpolative operation circuit and pixel data from the first, second, third and fourth memories;
   with the image signal interpolating circuit being in the form of an integrated circuit.

2. An image signal interpolating circuit as set forth in claim 1, further comprising:
   a control terminal which receives a control signal from the image signal decoding apparatus and outputs the control signal to the control means;
   an input terminal which receives the pixel data of 2×2 pixels from the image signal decoding apparatus and outputs the pixel data to the memories; and
   an output terminal which receives interpolated values from the interpolative operation circuit and pixel data from the memories, and which outputs processed data in the form of the interpolated values and the pixel data to the image signal decoding apparatus;
   with the control means controlling the input terminal so that the pixel data is output by the input terminal to the memories at a time indicated by the control signal; and
   with control means controlling the output terminal so that the interpolated data and the pixel data are output by the output terminal to the image signal decoding apparatus at a time indicated by the control signal.

3. An image signal interpolating circuit as set forth in claim 2, further comprising:
   a first selector for selectively storing the 2×2 pixel data in the first, second, third and fourth memories; and
   a second selector for selectively outputting either pixel data from the first, second, third and fourth memories or pixel data from the interpolative operation circuit to the output terminal.

4. An image signal interpolating circuit as set forth in claim 3, wherein the second selector selects for output pixel data from the memories in order to generate processed data of the integer precision, and the second selector selects for output interpolated values from the interpolative operation circuit in order to generate processed data of the half pixel precision.

5. An image signal interpolating circuit as set forth in claim 1 wherein the interpolative operation circuit calculates the interpolated value of two adjacent pixels of the 2×2 pixel data by adding the adjacent pixels and by dividing the added value by 2.

6. An image signal interpolating circuit as set forth in claim 1 wherein the interpolative operation circuit calculates an interpolated value of the intermediate position of the four pixels of the 2×2 pixel data by adding the four pixels and by dividing the added value by 4.

7. An image signal interpolating circuit as set forth in claim 1, wherein the image signal interpolating circuit is can calculate interpolated values for a processing to decode image data by motion vectors of the image data.

8. An image signal decoding apparatus comprising:
   an image signal interpolating circuit comprising a plurality of integrated circuits, each integrated circuit including:
   a first memory, second memory, third memory and fourth memory for storing pixel data of 2×2 pixels, with each of the first, second, third and fourth memories storing pixel data of at least one pixel;
   an interpolative operation circuit for calculating interpolated values on the basis of respective pixel data of 2×2 pixels stored in the first, second, third and fourth memories; and
   control means for controlling input of the pixel data to the integrated circuit and output of interpolated values from the integrated circuit and pixel data from the first, second, third and fourth memories;
   a reading circuit for reading image data and motion vector information from a memory medium,
   a frame memory for storing image data read from the memory medium;
   connecting means for connecting the plurality of integrated circuits to the frame memory so that the integrated circuits are arrayed to calculate interpolated values between respective pixels of a block comprised of pixels of x×m pixels (where n and m are positive integers);
   a detector for detecting the motion vector information; and
   a control circuit for generating control signals for the frame memory and the image signal interpolating circuit on the basis of motion vector information from the detector, thus to decode image data from the frame memory by the image signal interpolating circuit.

9. An image signal decoding apparatus as set forth in claim 8, wherein the memory medium is an optical disk.

10. An image signal decoding apparatus as set forth in claim 8, wherein the frame memory may store processed data which has been subjected to processing by the image signal interpolating circuit, and deliver the processed data to a display device.

11. An image signal decoding apparatus as set forth in claim 8 wherein the control means controls inputs a portion of the block comprised of x×m pixels (where n and m are integers of at least 2) from the frame memory into (n−1) sequential integrated circuits of the plurality of integrated circuits in the image signal interpolating circuit for calculation of interpolated values so that the memories of an (i)th integrated circuit (where i is an integer between 1 and (n−1) inclusive) stores pixels such that:

the first memory stores a pixel from the block at i×a where a is an integer between 1 and m−1 inclusive;

the second memory stores a pixel from the block at (i+1)×a;

the third memory stores a pixel from the block at i×(a+1); and the fourth memory stores a pixel from the block at (i+1)×(a+1).

* * * * *

UNITED STATES PATENT AND TRADEMARK OFFICE
CERTIFICATE OF CORRECTION

PATENT NO. : 5,396,592
DATED : March 7, 1995
INVENTOR(S) : Tadao Fujimoto

It is certified that error appears in the above-indentified patent and that said Letters Patent is hereby corrected as shown below:

Column 3, line 29, replace "data," with --data--
Column 8, line 5, replace "se rye" with --serve--

Signed and Sealed this

Sixth Day of June, 1995

Attest:

BRUCE LEHMAN

Attesting Officer      Commissioner of Patents and Trademarks